(12) United States Patent
Allen et al.

(10) Patent No.: US 7,827,400 B2
(45) Date of Patent: Nov. 2, 2010

(54) SECURITY CERTIFICATE MANAGEMENT

(75) Inventors: David L Allen, Kent, WA (US); David E Savage, Bellevue, WA (US); Kent Loving, Snohomish, WA (US); Bruce Pollock, Seattle, WA (US); John M Cloutier, Bellevue, WA (US); Denise M Smith, Bonney Lake, WA (US)

(73) Assignee: The Boeing Company, Chicago, IL (US)

( * ) Notice: Subject to any disclaimer, the term of this patent is extended or adjusted under 35 U.S.C. 154(b) by 1141 days.

(21) Appl. No.: 11/191,622

(22) Filed: Jul. 28, 2005

(65) Prior Publication Data

US 2007/0028095 A1 Feb. 1, 2007

(51) Int. Cl.
*H04L 29/06* (2006.01)
*H04L 9/32* (2006.01)
*H04K 1/00* (2006.01)

(52) U.S. Cl. .................. 713/156; 380/270; 713/176

(58) Field of Classification Search .......... 726/2; 713/176, 156; 380/270
See application file for complete search history.

(56) References Cited

U.S. PATENT DOCUMENTS

| | | | | |
|---|---|---|---|---|
| 5,103,476 A * | 4/1992 | Waite et al. | ......... | 705/59 |
| 5,894,323 A | 4/1999 | Kain et al. | ......... | 348/116 |
| 6,064,922 A | 5/2000 | Lee | ......... | 701/3 |
| 6,266,736 B1 | 7/2001 | Atkinson et al. | ......... | 711/103 |
| 6,816,728 B2 | 11/2004 | Igloi et al. | ......... | 455/431 |
| 6,859,688 B1 | 2/2005 | Orf et al. | ......... | 701/3 |
| 6,894,611 B2 | 5/2005 | Butz et al. | ......... | 340/539.1 |
| 7,020,708 B2 | 3/2006 | Nelson et al. | ......... | 709/230 |
| 7,114,070 B1 * | 9/2006 | Willming et al. | ......... | 713/156 |
| 2002/0032853 A1 * | 3/2002 | Preston et al. | ......... | 713/151 |
| 2003/0003872 A1 | 1/2003 | Brinkley et al. | ......... | 455/66 |
| 2003/0061435 A1 | 3/2003 | Ferguson et al. | ......... | 711/103 |

(Continued)

FOREIGN PATENT DOCUMENTS

GB 2 404 126 A 1/2005

(Continued)

OTHER PUBLICATIONS

Spyrou et al., Mobile Agents for Wireless Computing: The Convergence of Wireless Computational Models with Mobile-Agent Technologies, 2004, Mobile Networks and Applications 9, 517-528, Kluwer Academic Publishers. Manufactured in The Netherlands.*

(Continued)

*Primary Examiner*—Taghi T Arani
*Assistant Examiner*—Morshed Mehedi
(74) *Attorney, Agent, or Firm*—Harness, Dickey & Pierce, P.L.C.

(57) ABSTRACT

A system and method for establishing a mutually authenticated secure link between a mobile platform system and a remote system is provided. An onboard computer system (OCS) generates a dynamic certificate and digitally signs the dynamic certificate with a static certificate. The dynamic certificate is transmitted to a remote central computer system (CCS). The CCS verifies that the dynamic certificate is from a trusted source and sends a return dynamic certificate electronically signed with the static certificate to the OCS. The OCS verifies the return dynamic certificate is from the CCS, thereby establishing a mutually authenticated secure link between the OCS and the CCS.

12 Claims, 2 Drawing Sheets

U.S. PATENT DOCUMENTS

| | | | |
|---|---|---|---|
| 2003/0151493 A1* | 8/2003 | Straumann et al. | 340/5.25 |
| 2004/0039709 A1* | 2/2004 | Pirhonen et al. | 705/72 |
| 2004/0054907 A1* | 3/2004 | Chateau et al. | 713/175 |
| 2004/0056766 A1 | 3/2004 | Butz et al. | 340/539.1 |
| 2005/0026608 A1 | 2/2005 | Kallio et al. | 455/431 |
| 2005/0154909 A1* | 7/2005 | Zhang et al. | 713/200 |
| 2006/0002556 A1* | 1/2006 | Paul | 380/270 |
| 2006/0047381 A1 | 3/2006 | Nguyen | 701/29 |
| 2006/0272004 A1* | 11/2006 | Brockhaus et al. | 726/2 |
| 2007/0083766 A1* | 4/2007 | Farnham et al. | 713/176 |

FOREIGN PATENT DOCUMENTS

| | | |
|---|---|---|
| WO | WO 2005/031545 | 4/2005 |

OTHER PUBLICATIONS

"A Strong Client-Server Mutual Authentication Scheme"; disclosed by International Business Machines Corporation 41787.

U.S. Appl. No. 11/176,831, filed Jul. 7, 2005.

* cited by examiner

SECURITY CERTIFICATE MANAGEMENT

FIELD

The disclosure relates generally to communication between a mobile platform and mobile platform central operations center. More particularly, the disclosure relates to establishing a secure communications link between a computer system onboard the mobile platform and a computer based system at a central operations center of the mobile platform provider.

BACKGROUND

The evolution of wireless Internet Protocol (IP) communications for mobile platforms, such as aircraft, buses, trains and ships, has introduced significant challenges. Although such communication provides a flexible, wide-band data interface, it raises computing security concerns. For example, aircraft have historically utilized airplane communications addressing/reporting system (ACARS) to communicate between aircraft and between aircraft and ground system. However, there typically has been little to no security associated with this communications method. Additionally, IP communication technology introduces the potential for unauthorized access to sensitive data stored on mobile platform systems, such as an electronic flight bag of an aircraft, and/or mobile platform provider central systems, such as a central system for an airline. Traditionally, for Internet protocol based systems, the problem of unauthorized use has been solved by the management of security certificates which are exchanged between "trusted users". Generally, the "mobile" end of the "trusted environment" is a computer with an interactive user that can be involved in the acceptance of such security certificates. The update and exchange of such certificates was initially designed for dedicated computer users and involved periodic, specific interaction by a user at unplanned intervals.

However, in a mobile platform environment, the "mobile" end is often computer equipment or a computer system of the mobile platform. Crew of the mobile platform often have limited knowledge of computer security and workload requirements that make implementation of 'standard' security certificate systems operationally unfeasible. In many instances, the mobile platform computer equipment or components of the computer system can be exchanged or replaced. For example, some airlines utilize "spares pooling" which enables one airline to borrow computer equipment from another airline. Flight crews and maintenance crews make these exchanges during short turnaround times and are not typically authorized to implement an interactive exchange of security certificates between the newly installed computer equipment and the central computer system. Cryptographic hardware that could be used to automatically exchange security certificates between the newly installed computer equipment and the central computer would involve "parking" the mobile platform for extended periods and require considerable labor costs to install such hardware. Additionally, a dynamic, user interactive request for a mobile platform to accept a new certificate could come at a high workload time and rely on the knowledge of the user, which may be limited, thus, making such dynamic, interactive requests infeasible.

Therefore, it is desirable to implement an automated, secure, wireless certificate exchange solution that establishes secure link between a mobile platform computer system and a remote computer system to assure that only authorized users can access sensitive data stored on either system.

BRIEF SUMMARY

Various embodiments of the presenting disclosure provide a system and method for establishing a mutually authenticated secure link between a mobile platform system and a remote system. More particularly, in various embodiments, the disclosure provides a system and method for remotely, and dynamically generating security certificates that can be used to establish a secure link between a mobile platform system and a remote system. A public key infrastructure is created, where the owner or mobile platform provider implements a secure network, which includes a secure, self-signed certificate authority. This certificate authority is explicitly trusted on all computing systems to which the mobile devices must communicate securely.

Generally, a mobile platform provider computer based system or network generates and digitally signs a static certificate. The static certificate is stored at least one central computer system (CCS) that may include the mobile platform provider computer based system or communicatively connected thereto. The static certificate is issued to at least one onboard computer system (OCS) of the mobile platform and the OCS uses the static certificate to generate a dynamic certificate and digitally signs the dynamic certificate with the static certificate. When a secure link is desired between the OCS and the CCS, the dynamic certificate is transmitted to the CCS over an initial, generally open, communications link between the OCS and the CCS. Well known cryptographic protocols are used to mutually authenticate the end points and then setup a secure path for exchanging information.

Upon receipt of the dynamic certificate, the CCS verifies that the dynamic certificate is from a trusted source, i.e. that the dynamic certificate is signed with the shared static certificate. If the dynamic certificate is verified to have been sent by a trusted source, the CCS sends a return dynamic certificate digitally signed with the static certificate, also referred to as the root certificate, to the OCS. The OCS then verifies whether the return dynamic certificate is from the CCS, i.e. whether the return dynamic certificate is signed with a trusted certificate, e.g. the static certificate. If so, a mutually authenticated secure link between the OCS and the CCS is established that can be utilized as a virtual private network (VPN) between the OCS and the CCS.

The features, functions, and advantages of the present disclosure can be achieved independently in various embodiments of the present disclosures or may be combined in yet other embodiments.

BRIEF DESCRIPTION OF THE DRAWINGS

The present disclosure will become more fully understood from the detailed description and accompanying drawings, wherein.

Corresponding reference numerals indicate corresponding parts throughout the several views of drawings.

DETAILED DESCRIPTION

The following description of the preferred embodiments is merely exemplary in nature and is in no way intended to limit the disclosure, its application or uses. Additionally, the advantages provided by the preferred embodiments, as described below, are exemplary in nature and not all preferred embodiments provide the same advantages or the same degree of advantages.

Figure 1:
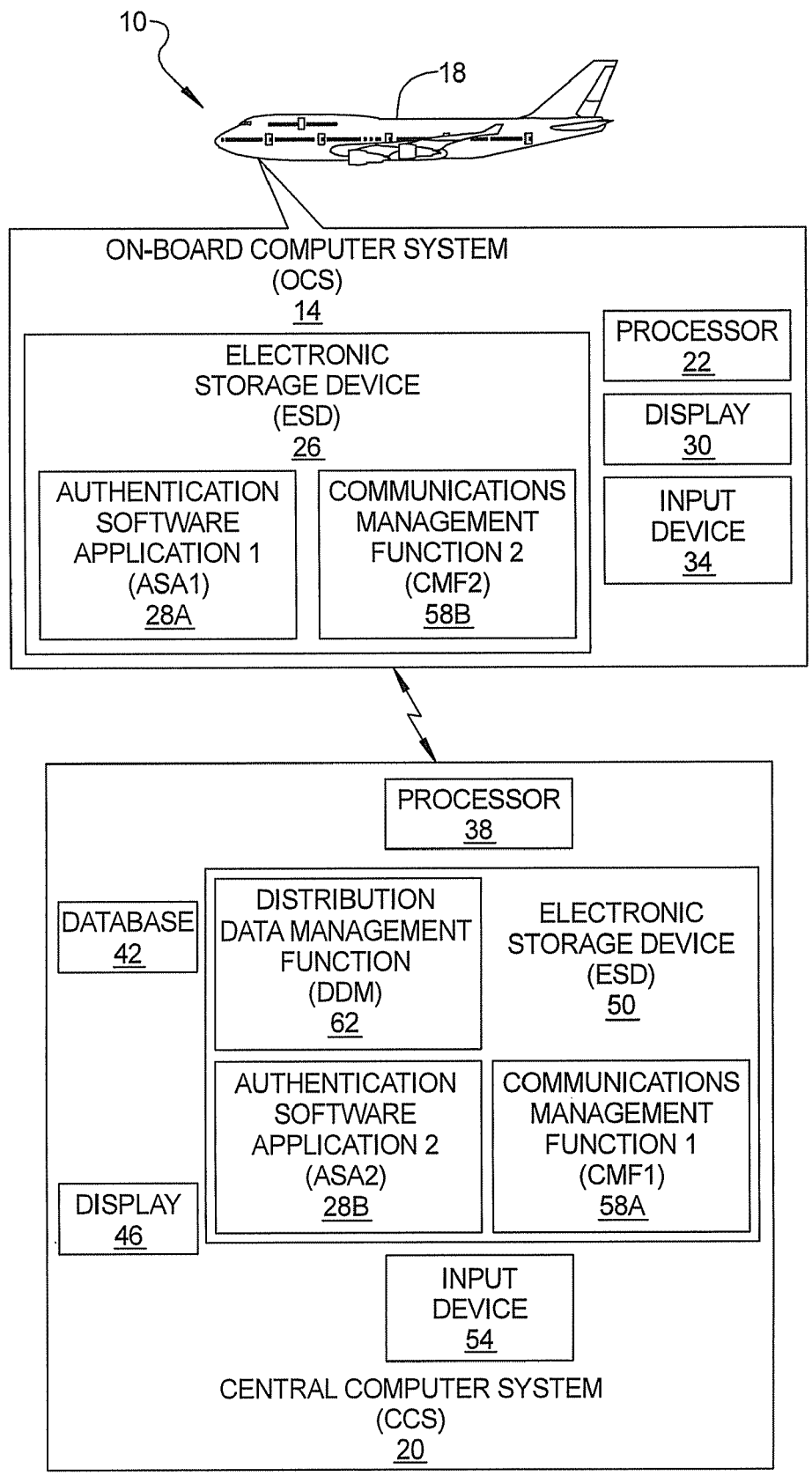
FIG. 1 is a block diagram of a mobile platform communications system (MPCS), in accordance with various embodiments of the present disclosure.

FIG. 1 is a block diagram of a mobile platform communications system (MPCS) 10, in accordance with various embodiments of the present disclosure. The MPCS 10 includes at least one onboard computer system (OCS) 14 onboard one or more mobile platforms 18 and at least one central computer system (CCS) 20 located remotely from the OCS 14 and configured to communicate with the OCS 14. Communications between the OCS 14 and the CCS 20 can be established using any suitable wired or wireless communications link, protocol or service. For example, in various embodiments a wireless connection is established between the OCS 14 and the CCS 20 using GPRS (General Packet Radio Service), VHF, wireless IEEE 802.11 communication and/or satellite networks that implement either Internet or ACARS$^{SM}$ (Airplane Communications and Recording System) protocols. ACARS$^{SM}$ can be provided by ARINC, Inc. of Annapolis, MD or SITA of Geneva, Switzerland.

The OCS 14 can be a stand alone system or a subsystem of any other system, network or component onboard the mobile platform 18. For example, in various embodiments the OCS 14 is an electronic travel aid utilized by an operator of the mobile platform 18 to enhance ease and efficiency of many tasks the operator must perform during operation of the mobile platform 18. For example, the electronic travel aid could be an "electronic flight bag (EFB)" employed by some airlines to aid pilots during flight. Alternatively, the OCS 14 can be a subsystem of an onboard LAN or an onboard mobile platform control system. Although the mobile platform 18 is illustrated as an aircraft, the disclosure is not limited to aircraft applications. That is, the mobile platform 18 could be any mobile platform such as an aircraft, bus, train or ship.

The OCS 14 includes a processor 22 for executing all functions of the OCS 14 and an electronic storage device (ESD) 26 for electronically storing a first portion 28A of an authentication software application (ASA) 28, and other applications, data, information and algorithms. The first portion 28A of the ASA software application 28 will be referred to herein as simply the ASA1 28A. The OCS ESD 26 can be any computer readable medium device suitable for electronically storing such things as data, information, algorithms and/or software programs executable by the OCS processor 22. For example, the OCS ESD 26 can be a hard drive, a Zip drive, a CDRW drive, a thumb drive or any other electronic storage device. The OCS 14 additionally includes a display 30 for illustrating graphical and textual data, forms and other information, and an input device 34 such as a keyboard, mouse, stylus or joy stick for inputting data and information to the OCS 14 to be stored on the OCS ESD 26. It should be understood that the OCS processor, ESD, display and input device 22, 26, 30 and 34 can be components of a stand alone computer based system, i.e. the OCS 14, or components of a larger system, such as an onboard LAN or an onboard mobile platform control system that collectively comprise the OCS 14. Alternatively, the OCS 14 can be a stand alone system that is connectable to a larger system, e.g. an onboard LAN, such that various ones of the OCS processor, ESD, display and input device 22, 26, 30 and 34 are included in the stand alone OCS 14 and others are included in the larger system.

Generally, the OCS processor 22 executes the ASA1 28A to automatically establish a secure communications link with the CCS 20, as described below. As used herein, the term automatically should be understood to mean an automated event that is initiated, occurs and is controlled by the OCS 14 and or the CCS 20 without manual intervention, i.e. with interaction or input by a person, e.g. mobile platform crew, maintenance crew and/or mobile platform provider personnel. The CCS 20 includes at least one processor 38, at least one database 42, at least one display 46, at least one electronic storage device (ESD) 50 and at least one input device 54. The CCS display 46 can be any display suitable for visually presenting graphics, text and data to a user of the MPCS 10. The CCS input device 54 can be any device adapted to input data and/or information into CCS 20, for example a keyboard, a mouse, a joystick, a stylus, a scanner, a video device and/or an audio device. The CCS ESD 50 can be any computer readable medium device suitable for electronically storing a second portion 28B of the ASA 28, and such other things as data, information and algorithms and/or software programs executable by the CCS processor 38. For example, the CCS ESD 50 can be a hard drive, a Zip drive, a CDRW drive, a thumb drive or any other electronic storage device. The second portion 28B of the ASA 28 will be referred to herein simply as the ASA2 28B.

The CCS database 42 is also an electronic memory device, i.e. computer readable medium, for storing large quantities of data organized to be accessed and utilized during various operation of the MPCS system 10. For example, a plurality of look-up tables containing maintenance data, fault data, maintenance procedures and mobile platform metrics may be electronically stored on the CCS database 42 for access and use by the MPCS system 10 and users of the MPCS system 10. The CCS processor 38 controls all operations of the CCS 20. For example, the CCS processor 38 controls wireless communications between the OCS 14 and the CCS 20, transferring data and information between the ASA1 28A and the CCS 20, displaying graphics and data on the CCS display 46, interpreting and routing information and data input by the CCS input device 54 and the executing various algorithms stored on the CCS ESD 42. Additionally, the CCS processor 38 executes the ASA2 28B to establish a secure communications link with the CCS 20, as described below.

Sensitive data and information, such as mobile platform metrics and fault data need to be communicated between the OCS 14 and the CCS 20 over a secure link to prevent unauthorized access to such data and information. The data and information can then be stored in the CCS ESD 50 or the CCS database 42, or the data can be shared with other computer systems or networks authorized by an operator of the CSS 20. For example, the data can be shared with mobile platform performance monitoring and maintenance systems that ensure that regularly scheduled maintenance is performed and that the mobile platform 18 and all systems onboard are maintained in proper operational order. The mobile platform performance monitoring and maintenance systems may be software applications stored on the CCS ESD 50 or may be separate computer based systems communicatively linked with the CCS 20.

Figure 2:
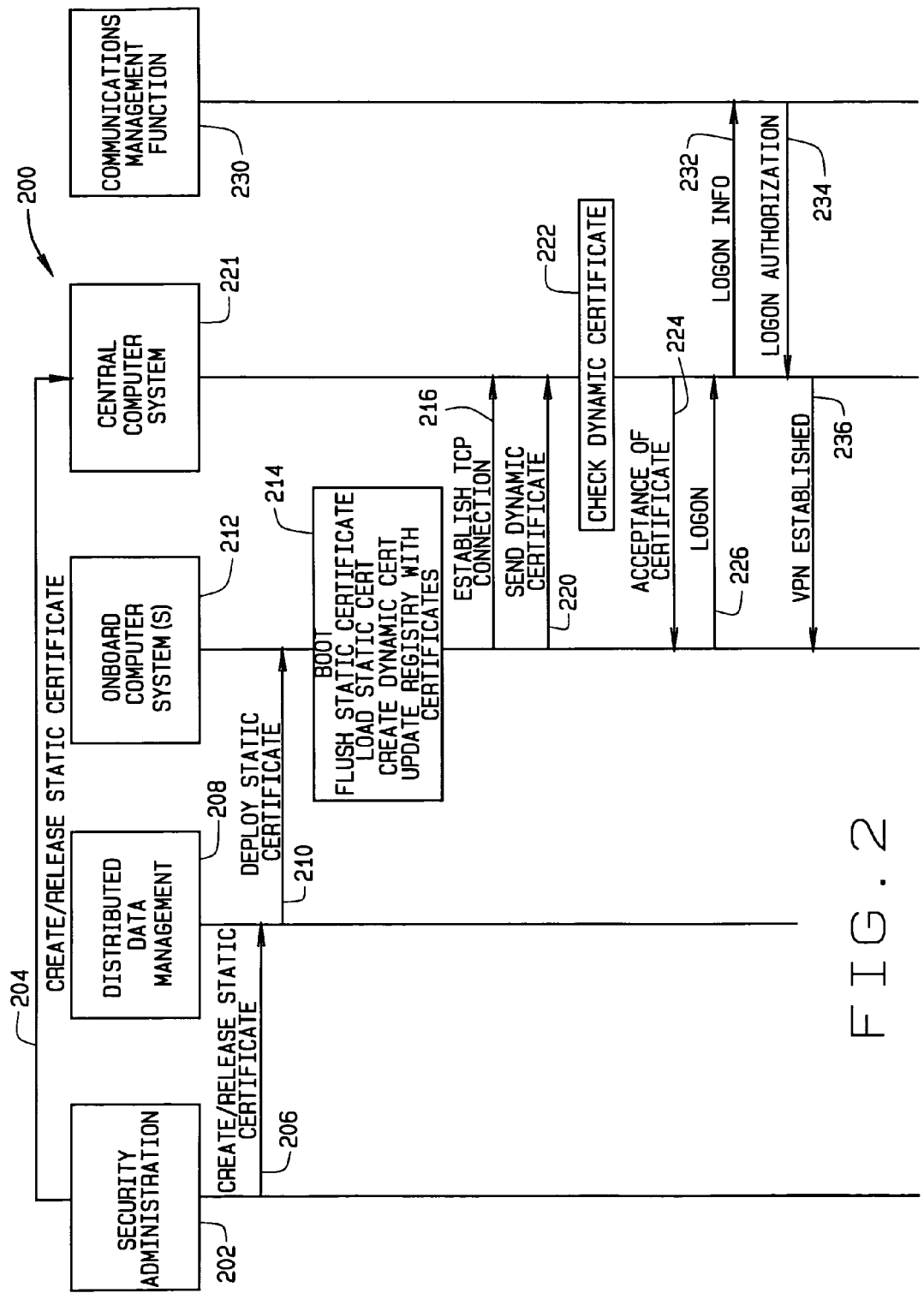
FIG. 2 is a sequence diagram illustrating a method of establishing a secure link between at least one onboard computer system and at least one central computer system (shown in FIG. 1), in accordance with the present disclosure.

Referring now to FIGS. 1 and 2, FIG. 2 is a sequence diagram 200 illustrating a method of establishing a secure link between at least one OCS 14 and at least one CCS 20, in accordance with one methodology of the present disclosure. As indicated at 202, a mobile platform provider system executes a security administration routine to generate and digitally sign a static certificate. In various embodiments, the mobile platform provider system is a remote computer network or system communicatively connected to the CCS 20. Alternatively, the mobile platform provider system can be the CCS 20 or a subsystem thereof. As indicated at 204 the static certificate is communicated to the CCS ESD 50 for later retrieval and use during execution of the ASA2 28B, described below. Additionally, as indicated at 206, the static certificate is passed to a distributed data management function 62 of the mobile platform provider system that is executed to issue the static certificate to the OCS(s) 14, as indicated at 208 and 210. Specifically, the static certificate is encoded into a configuration file that is loaded into each OCS 14. The configuration file containing the static certificate can be loaded into each OCS 14 in any suitable software loading manner. For example, the configuration file containing the static certificate can be loaded through a portable maintenance terminal (PMAT) or from a "staged" load which is wirelessly parked on each OCS 14. An exemplary staged loading system and method are described in copending patent application titled, "Mobile Platform Distributed Data Load Management System', filed Jul. 7, 2005, (now U.S. Pat. No. 7,260,389), and assigned to The Boeing Company, which is herein incorporated by reference in its entirety.

If the MPCS 10 includes a plurality of OCS's 14, each OCS 14 is loaded with the same configuration file containing the same static certificate. Generally, the mobile platform provider system generates a single static certificate that identifies the mobile platform provider and loads the configuration file containing the static certificate on the CCS 20 and all onboard systems, e.g. OCS(s) 14, that the mobile platform provider wants the CCS 20 to recognize as a trusted system.

Typically, the OCS 14 is booted up after each time the OCS 14 is installed, moved, or reconfigured. As indicated at 212, upon "boot up" of the OCS 14, the OCS processor 22 executes the ASA1 28A. As indicated at 214, execution of the ASA1 28A flushes, i.e. deletes, any preexisting pertinent authorization, authentication and static certificate data that may be stored on the OCS ESD 26. For example, if the OCS 14 has been removed from a first mobile platform 18 and subsequently installed in second mobile platform 18, execution of the ASA1 28A will delete all pre-existing pertinent authorization, authentication and static certificate data. As additionally indicated at 214, execution of the ASA1 28A loads the static certificate encoded into the configuration file of the OCS 14. Execution of the ASA1 28A then creates a dynamic certificate, as also indicated at 214. To create the dynamic certificate, the ASA1 28A obtains pertinent information identifying the OCS 14, such as identification of the mobile platform provider, an identification number of the mobile platform 18 in which the OCS 14 is installed, e.g. a tail number of an aircraft, an identification number of the OCS 14, the location of the OCS 14 on the mobile platform 18, and whatever other critical information is necessary to specify the unique identity of the OCS 14. The ASA1 28A generates a dynamic certificate based on the pertinent identification information and electronically signs the dynamic certificate using the static certificate. As further indicated at 214, the newly created dynamic certificate is stored in the OCS ESD 26, for example a registry within the OCS ESD 26 is updated with the newly created dynamic certificate. Thus, the OCS 14 creates a unique cryptographic key pair that contains the precise identity of the OCS 14.

When the mobile platform arrives at a destination terminal or any time while the mobile platform is in route to the destination terminal, the OCS 14 can initiate a communications connection with the CCS 20, for example a transmission control protocol (TCP) connection, as indicated at 216. Once the communication connection is established, the ASA1 28A transmits the generated dynamic certificate to the CCS 20, as indicated at 220. As indicated at 221, the CCS processor 38 executes the ASA2 28B to read the signature, i.e. the static certificate, of the dynamic certificate received. Execution of the ASA 28B verifies whether the dynamic certificate is from a trusted user, as indicated at 222. Since the dynamic certificate was digitally signed with the static certificate CCS 20 will recognize or validate the dynamic certificate as coming from a trusted source.

Once verified as a trusted source, the CCS 20 sends an acceptance message to the OCS 14, as indicated at 224. Generally, the ASA2 28B will send a return dynamic certificate identifying the CCS 20 and digitally signed with the same static certificate to the OCS 14. Because the return dynamic certificate is signed by the same static certificate, the OCS 14 will recognize the CCS 20 as a trusted source and the mutually authenticated link will be established. Thus, a secure, public key based, mutually authenticated link is established between the CCS 20 and the OCS 14 using any suitable security protocol.

The OCS 14 then logs into the CCS 20 and the ASA2 28B reads the pertinent OCS 14 identification information, e.g. mobile platform identification number, OCS 14 serial number and/or rack position, included in the dynamic certificate to configure itself as necessary to communicate with the OCS 14, as indicated at 226.

Additionally, the CCS 20 includes a first portion or peer application, 58A of communications management function (CMF) stored on the CCS ESD 50. A second portion, or peer application, 58B of the CMF is stored on the OCS ESD 26. The first and second portions 58A and 58B of the CMF will be respectively referred to herein as the CMF1 58A and the CMF2 58B and collectively referred to herein as the CMF 58. Generally, the CMF 58 provides application program interfaces to allow the ASA1 28A and the ASA2 28B to communicate, as described further below. If more than one OCS 14 has established a mutually authenticated link with the CCS 20, execution of the CMF 58 matches the pertinent OCS 14 identification information against a list included in the CMF2 58B so that the CCS 20 can track which OCSs 14 are logged on and validate the authorized user. Additionally, once the secure link is established between the CCS 20 and the OCS 14, the secure link may be utilized as a secure tunnel or channel of a virtual private network (VPN), as indicated at 230, 232, 234 and 236. As indicated at 232 the OCS 14 utilizes the CCS 20 to log on to the CCS 20. This allows the CCS 20 to track a plurality of mobile platforms 18 included in the MPCS 10, each of which include one or more OCSs 14 that communicate with the one or more CCSs 20. The CMF 58 also adds a second layer of protection to disallow non-authorized users.

For example, the OCS 14 can utilize the dynamic certificate generated by the ASA1 38A, as described above, to establish a secure link with a second CCS 20 through the previously established secure channel between the OCS 14 and the first CCS 20. Or, a second OCS 14 having the same static certificate programmed into its configuration files can utilize the established secure channel to set up a secure link with the CCS 20 using a dynamic certificate generated by, and including pertinent identification information of, the second OCS 14, in the same manner as described above. Even further, the second OCS 14 can generate a dynamic certificate, as described above, to create a secure link with a second CCS 20, via the previously established secure channel.

The mobile platform provider can update the security paradigm by issuing a new static certificate. Since this MPCS 10 treats the static certificate as a configured part, established configuration management procedures are used which isolate the mobile platform operator and maintenance personnel from specialized procedures.

The mobile platform communications system 10 utilizes the standard software configuration control processes of the mobile platform provider, along with the automated ASA 28, to exchange the appropriate security certificates and establish a secure link between the OCS(s) 14 and the CCS(s) 20. This is done by implementing the static certificate as part of the standard OCS 14 configuration, and automatically generating a dynamic certificate by execution of the ASA1 28A upon powering up of the OCS 14, and execution of the ASA2 28B when the OCS 14 initiates a communication connection with the CCS 20.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification and following claims.

What is claimed is:

1. A method for initiating a secure link between a mobile platform system operated by a mobile platform operator and a remote system without manual intervention, said method comprising:
   generating and digitally signing a static certificate using information concerning an identity of the mobile platform operator;
   issuing the static certificate to at least one onboard computer system (OCS) of the mobile platform;
   automatically generating a dynamic certificate utilizing the OCS and information concerning an identity of the OCS and an identity of the mobile platform that the OCS is being used on, and digitally signing the dynamic certificate with the static certificate;
   transmitting the dynamic certificate to at least one central computer system (CCS) located remotely from the mobile platform over a communications link between the OCS and the CCS;
   verifying that the dynamic certificate is from a trusted source utilizing the CCS, thereby initiating a secure link between the OCS and the CCS;
   generating and sending a return dynamic certificate electronically signed with the static certificate from the CCS to the OCS;
   wherein said issuing the static certificate to the OCS comprises encoding the static certificate into a configuration file; and
   wherein said issuing the static certificate further comprises executing a first portion of an authentication software application (ASA1) stored in the OCS upon turning on the OCS to delete preexisting pertinent authorization, authentication and static certificate data stored in the OCS, and load the configuration file into the OCS.

2. The method of claim 1, wherein said generating the dynamic certificate comprises:
   configuring the CCS to communicate with the OCS using the OCS identification information.

3. The method of claim 1, wherein said generating the dynamic certificate comprises:
   automatically providing an electronic signature for the dynamic certificate using the static certificate; and
   automatically storing the dynamic certificate in the OCS.

4. The method of claim 1, wherein said verifying that the dynamic certificate is from a trusted source comprises executing a second portion of an authentication software application (ASA2) stored in the CCS to verify that the dynamic certificate was digitally signed with the static certificate.

5. The method of claim 1, wherein the method further comprises verifying that the return dynamic certificate is from the CCS, utilizing the OCS, thereby establishing a mutually authenticated secure link between the OCS and the CCS.

6. The method of claim 5, wherein the method further comprises utilizing the mutually authenticated secure link as a virtual private network (VPN) for communication between the mobile platform and the CCS.

7. A method for establishing a mutually authenticated secure link between a mobile platform system operated by a mobile platform operator, and a remote system, said method comprising:
   generating and digitally signing a static certificate using information identifying the mobile platform operator;
   storing the static certificate in an electronic storage device (ESD) of at least one central computer system (CCS) located remotely from the mobile platform;
   issuing the static certificate to at least one onboard computer system (OCS) of the mobile platform;
   automatically generating a dynamic certificate utilizing the OCS and information identifying the OCS and an identity of the mobile platform that the OCS is being used on, and digitally signing the dynamic certificate with the static certificate;
   transmitting the dynamic certificate to the CCS over a communications link initiated between the OCS and the CCS;
   verifying, utilizing the CCS, that the dynamic certificate is from a trusted source; sending a return dynamic certificate electronically signed with the static certificate from the CCS to the OCS;
   verifying, utilizing the OCS, that the return dynamic certificate is from the CCS, thereby establishing a mutually authenticated link between the OCS and the CCS;
   wherein the method further comprises sending a return dynamic certificate electronically signed with the static certificate from the CCS to the OCS;
   wherein said issuing the static certificate comprises:
   encoding the static certificate into a configuration file;
   loading the configuration file including the static certificate into the OCS; and
   wherein said loading the configuration file comprises executing a first portion of a first portion of an authentication software application (ASA1) to delete preexisting pertinent authorization, authentication and static certificate data stored in the OCS, and load the configuration file in the OCS upon turning on the OCS.

8. The method of claim 7, wherein said generating the dynamic certificate comprises:
   automatically obtaining the OCS identification information and including the OCS identification information in the dynamic certificate; and
   storing the dynamic certificate in the OCS.

9. The method of claim 7, wherein said verifying that the dynamic certificate is from a trusted source comprises execution of a second portion of an authentication software application (ASA2) stored in the CCS to verify that the dynamic certificate was digitally signed with the static certificate.

10. A system for establishing a mutually authenticated secure communications link between a mobile platform operated by a mobile platform operator, and a remote computer network, said system comprising:
    a static certificate including information concerning the mobile platform operator, created by a computer system of the mobile platform operator;

at least one onboard computer system (OCS) of the mobile platform including a OCS processor adapted to execute a first portion of an authentication software application (ASA1) stored in the OCS; and at least one central computer system (CCS) located remotely from the mobile platform adapted to wirelessly communicate with the OCS, the CCS including a CCS processor adapted to execute a second portion of the authentication software application (ASA2) stored in the CCS;

wherein the execution of the ASA1 is adapted to:

automatically generate and digitally sign a dynamic certificate with the static certificate created by the mobile platform operator computer system and issued by the CCS, the dynamic certificate being created using information concerning the identity of the OCS and an identity of the mobile platform on which the OCS is being used; and automatically transmit the dynamic certificate to the CCS via a wireless communication link between the OCS and the CCS; and wherein the execution of the ASA1 is adapted to:

store the static certificate in an electronic storage device (ESD) of the CCS;

issue the static certificate to OCS;

verify that the dynamic certificate is signed with the static certificate; send a return dynamic certificate electronically signed with the static certificate to the OCS to establish a mutually authenticated link between the OCS and the CCS;

wherein to issue the static certificate to the OCS, execution of the ASA2 is further adapted to encode the static certificate into a configuration file; and wherein to generate and digitally sign a dynamic certificate, execution of the ASA1 is further adapted to automatically delete preexisting pertinent authorization, authentication and static certificate data stored in the OCS, and load the configuration file into the OCS upon turning on the OCS.

11. The system of claim 10, wherein said execution of the ASA1 is further adapted to verify that the return dynamic certificate is signed with the static certificate.

12. The system of claim 9, wherein said execution of the ASA1 is further adapted to:

verify that the return dynamic certificate is signed with the static certificate, thereby establishing the mutually authenticated secure link between the OCS and the CCS, wherein the mutually authenticated secure link provides a virtual private network (VPN) for communication between the mobile platform and the CCS.

* * * * *